(12) United States Patent
Moake (10) Patent No.: US 10,061,056 B2
(45) Date of Patent: Aug. 28, 2018

(54) NEUTRON TOOL WITH DUAL-PURPOSE DETECTOR

(71) Applicant: Halliburton Energy Services, Inc., Houston, TX (US)

(72) Inventor: Gordon L. Moake, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/770,632

(22) PCT Filed: May 30, 2013

(86) PCT No.: PCT/US2013/043320
§ 371 (c)(1),
(2) Date: Aug. 26, 2015

(87) PCT Pub. No.: WO2015/178872
PCT Pub. Date: Nov. 26, 2015

(65) Prior Publication Data
US 2016/0154141 A1    Jun. 2, 2016

(51) Int. Cl.
*G01V 5/10* (2006.01)
*E21B 47/00* (2012.01)

(52) U.S. Cl.
CPC .............. *G01V 5/104* (2013.01); *E21B 47/00* (2013.01)

(58) Field of Classification Search
CPC .................................................... G01V 5/104
See application file for complete search history.

(56) References Cited

U.S. PATENT DOCUMENTS

| | | | |
|---|---|---|---|
| 4,482,808 A * | 11/1984 | Tominaga et al. | 250/392 |
| 5,521,378 A | 5/1996 | Roscoe et al. | |
| 7,365,307 B2 * | 4/2008 | Stoller et al. | 250/269.2 |
| 2010/0176286 A1 | 7/2010 | Duraj | |
| 2010/0193676 A1 * | 8/2010 | Jacobson et al. | 250/269.6 |
| 2010/0262371 A1 * | 10/2010 | Oraby | G01V 5/104 702/8 |
| 2011/0272570 A1 * | 11/2011 | Xu et al. | 250/269.4 |

(Continued)

FOREIGN PATENT DOCUMENTS

WO    WO-2013/059394 A1    4/2013

OTHER PUBLICATIONS

Glodo, J., et al., "$Cs_2LiYCl_6$: Ce Neutron Gamma Detection System", *IEEE Nuclear Science Symposium Conference Record, 2007. NSS '07*, vol. 2, (2007), 959-962.

(Continued)

*Primary Examiner* — Hugh H Maupin
(74) *Attorney, Agent, or Firm* — Gilliam IP PLLC (57) ABSTRACT

Various embodiments include apparatus and methods to conduct measurements on a formation using a dual purpose detector. The dual purpose detector can be disposed on a neutron tool in a borehole, where the dual purpose detector operatively detects neutrons and gamma rays in response to the formation being probed using a neutron source of the neutron tool. Porosity of the formation can be determined from data based on the neutrons and gamma rays detected by the dual purpose detector. Additional apparatus, systems, and methods are disclosed.

30 Claims, 6 Drawing Sheets

(56) References Cited

U.S. PATENT DOCUMENTS

| | | | |
|---|---|---|---|
| 2012/0080598 A1 | 4/2012 | Aspinall | |
| 2012/0200421 A1* | 8/2012 | Duraj | G01V 5/04 340/853.2 |
| 2012/0326048 A1* | 12/2012 | Nikitin et al. | 250/393 |
| 2013/0105679 A1* | 5/2013 | Climent | G01V 5/104 250/269.2 |
| 2014/0231640 A1* | 8/2014 | Grau | G01V 5/101 250/269.6 |
| 2014/0319330 A1* | 10/2014 | Berheide | G01T 3/06 250/269.5 |

OTHER PUBLICATIONS

Glodo, J., et al., "Dual Gamma Neutron Detection with $Cs_2LiLaCl_6$", *Proc. SPIE*, 7449, (2009), 74490E1-74490E-7.

"International Application Serial No. PCT/US2013/043320, International Preliminary Report on Patentability dated Dec. 17, 2015", 13 pgs.

"International Application Serial No. PCT/US2013/043320, International Search Report dated Nov. 25, 2015", 3 pgs.

"International Application Serial No. PCT/US2013/043320, Written Opinion dated Nov. 25, 2015", 11 pgs.

"Gulf Cooperation Council Application Serial No. 2014-27249, First Examination Report dated Jul. 25, 2017", 4 pages.

Gulf Cooperation Council Application Serial No. GC 2014-27249; Second Office Action; dated Dec. 20, 2017, 4 pages.

\* cited by examiner

NEUTRON TOOL WITH DUAL-PURPOSE DETECTOR

PRIORITY APPLICATIONS

This application is a U.S. National Stage Filing under 35 U.S.C. 371 from International Application No. PCT/US2013/043320, filed on 30 May 2013, which application is incorporated herein by reference in its entirety.

TECHNICAL FIELD

The present invention relates generally to apparatus and methods of making and evaluating measurements.

BACKGROUND

In drilling wells for oil and gas exploration, understanding the structure and properties of the associated geological formation provides information to aid such exploration. A number of different measurements in a borehole can be performed to attain this understanding. Measurements may include using a neutron tool to make measurements to determine properties of a formation under investigation. Further, the usefulness, efficiency, and accuracy of traditional measurements may be related to the precision or quality of the techniques to attain and process data derived from such measurements. Techniques and apparatus to simplify measurements, to enhance processing of measured data, to enhance analysis of data from measurements to provide properties of a formation or borehole, or to provide combinations thereof can further aid in drilling operations.

Figure 1:
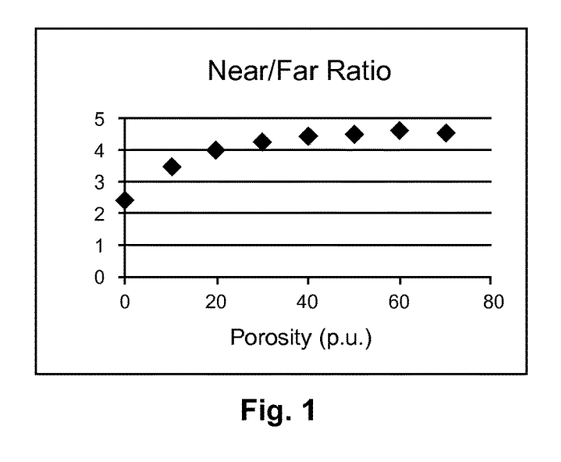
FIG. 1 illustrates a near/far ratio of gamma ray counts for data obtained from computer modeling of a casing in a formation.

In some conventional tools, porosity is measured using a pulsed-neutron generator and two detectors that measure gamma rays, which can be presented as count rates of gamma rays. One of the detectors is spaced from the pulsed-neutron generator at a larger distance than the other detector, defining near and far detectors. The ratio of the near-to-far count rates of gamma rays measured between 130 and 1000 μsec after the neutron burst can be generated in an example tool. Such a tool can have a problem in measuring porosity in cased holes at high porosity, because the tool response may be insensitive to porosity at high porosities. This is illustrated in FIG. 1, where a near/far ratio is shown for data obtained from computer modeling. The model was generated for limestone formations filled with fresh water and a 7-in casing with a 0.25-inch wall thickness and 1.4-inch thick cement. The ratio in this case has very little sensitivity to porosity above 30 p.u.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Figure 2A:
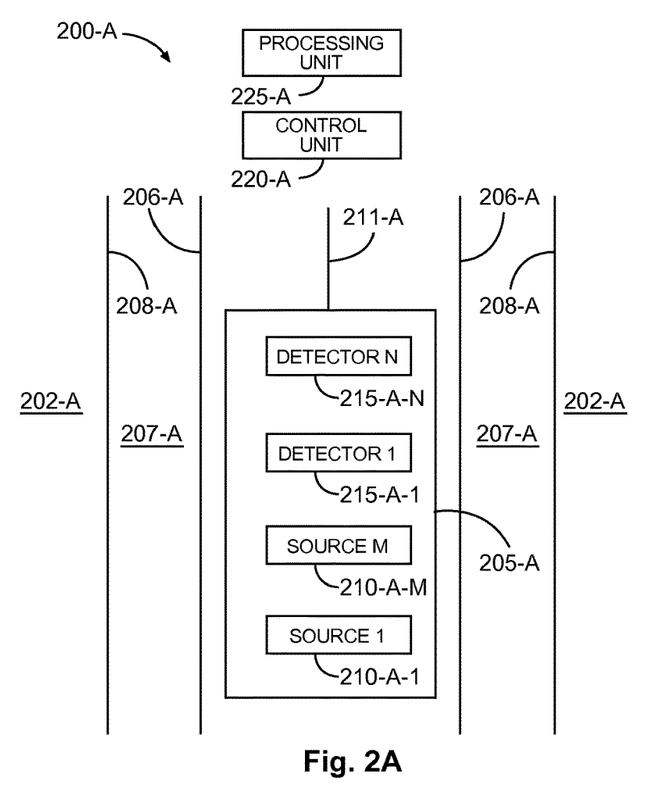
FIG. 2A depicts a block diagram of features of an example system having a neutron tool deployable in a cased hole to make measurements of a formation, in accordance with various embodiments.

FIG. 2A depicts a block diagram of features of an embodiment of an example system 200-A having a neutron tool 205-A deployable in a cased hole to make measurements of a formation 202-A. The cased hole includes a casing 206-A and cement 207-A, the cement 207-A being between the casing 206-A and wall 208-A of the hole. Neutron tool 205-A can be disposed in casing 206-A using a cable-like structure 211-A, providing a wireline application. The neutron tool 205-A can include a number of neutron sources 210-A-1 . . . 210-A-M and a number of detectors 215-A-1 . . . 215-A-N. The neutron sources 210-A-1 . . . 210-A-M may be realized in a number of different formats. The neutron sources 210-A-1 . . . 210-A-M can be one or more pulsed-neutron sources. The neutron sources 210-A-1 . . . 210-A-M can be one or more radionuclide sources. The radionuclide sources can include, but are not limited to, americium/beryllium (Am/Be) sources or californium-252 sources. An AmBe source can be made by mixing americium-241 with beryllium. The neutron sources 210-A-1 . . . 210-A-M can include other types of neutron generators.

The detectors 215-A-1 . . . 215-A-N can include one or more dual purpose detectors. The detectors 215-A1 . . . 215-A-N may include one or more sodium-iodide detectors with the one or more dual purpose detectors. The system 200-A can include instrumentality to make inelastic counts and capture counts of neutron-induced gamma rays and to generate ratios of inelastic counts to capture counts. The system 200-A can include instrumentality to make counts of neutrons detected and counts of gamma rays received from regions exterior to the neutron tool 205-A in response to neutrons from one or more neutron sources 210-A-1 . . . 210-A-M.

The dual purpose detectors can be detectors having a capability to detect both neutrons and gamma rays. The detector can include crystal $Cs_2LiYCl_6$ to measure both neutrons and gamma rays. The crystal $Cs_2LiYCl_6$ can provide a scintillating crystal that measures both neutrons and gamma rays. Other materials that are operable to detect both neutrons and gamma rays can be used. Such detectors can be used in measurements that can provide a better porosity measurement at high porosity than conventional tools.

The detectors can be enclosed in a flask to improve their response at elevated temperatures. By keeping the detector temperature lower than the ambient downhole temperature, the flask may serve to increase the signal amplitude and improve reliability of the pulse-shape discrimination.

In addition to the one or more neutron sources 210-A-1 . . . 210-A-M operable in the borehole 204-A to probe the formation 202-A and the one or more detectors 215-A-1 . . . 215-A-N, where at least one of the one or more detectors 215-A-1 . . . 215-A-N has a capability to detect both neutrons and gamma rays, the system 200-A can include a processing unit 225-A arranged to operatively determine porosity of the formation 202-A from data based on the neutrons and gamma rays detected by one or more detectors having the capability to detect both neutrons and gamma rays. The one or more detectors 215-A-1 . . . 215-A-N can be spaced apart from one or more neutron sources 210-A-1 . . . 210-A-M. The one or more detectors 215-A-1 . . . 215-A-N may include two detectors having the capability to detect both neutrons and gamma rays. The two detectors having the capability to detect both neutrons and gamma rays can have different spacings from a neutron source. Both detectors can include crystal $Cs_2LiYCl_6$ to measure both neutrons and gamma rays.

The processing unit 225-A can be structured to operatively implement pulse-shape discrimination to differentiate between neutrons and gamma rays. This discrimination can be based on the neutrons and the gamma rays interacting with material of the detector to produce outputs with different time profiles. The processing unit 225-A may also implement a pulse height discrimination based on signal amplitudes from the detector being different for the signals generated from interaction of neutrons with the material of the detector and the signals generated from interaction of gamma rays with the material of the detector. The pulse height discrimination can be used with the pulse-shape discrimination in the analysis of the measurement signals.

The processing unit 225-A can be structured to operatively determine a ratio of number of gamma rays that reach the detector to number of neutrons that reach the detector. The processing unit 225-A can be structured to operatively map the ratio to the porosity of the formation. The processing unit 225-A can be structured to operatively determine a first ratio of number of gamma rays that reach the detector to number of neutrons that reach the detector and to determine a second ratio of number of gamma rays that reach another detector to number of neutrons that reach the other detector, where the other detector is can detect both neutrons and gamma rays. The processing unit 225-A can be structured to operatively combine the first ratio and the second ratio to determine the porosity of the formation. The processing unit 225-A can implement gamma ray processing using known techniques for gamma ray processing in porosity measurements. In various embodiments, neutron measurements can be utilized in the porosity measurement to improve the porosity measurement.

The instrumentality can include a control unit 220-A to manage operation of the number of neutron sources 210-A-1 . . . 210-A-M and the number of detectors 215-A-1 . . . 215-A-N. The control unit 220-A and the processing unit 225-A may be integrated with each other. The control unit 220-A and the processing unit 225-A may be integrated with the neutron tool 205-A operable downhole. The control unit 220-A and the processing unit 225-A may have distributed components. Distributed components may include components downhole in the vicinity of the neutron tool 205-A deployed for operation and components at the surface or at locations between the surface and the vicinity of the operational neutron tool 205-A.

Figure 2B:
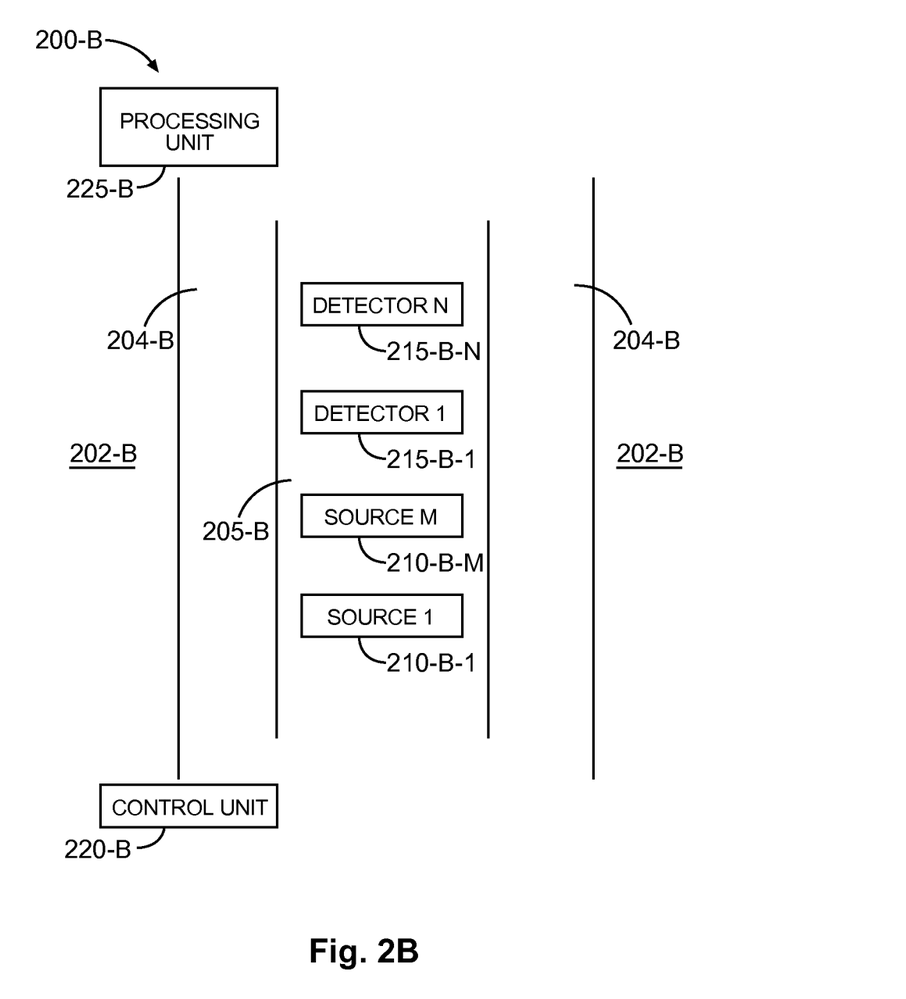
FIG. 2B depicts a block diagram of features of an example system having a neutron tool deployable in an open borehole to make measurements of a formation, in accordance with various embodiments.

FIG. 2B depicts a block diagram of features of an embodiment of an example system 200-B having a neutron tool 205-B deployable in an open borehole 204-B to make measurements of a formation 202-B. The neutron tool 205-B can include a number of neutron sources 210-B-1 . . . 210-B-M and a number of detectors 215-B 1 . . . 215-B N. The neutron sources 210-B-1 . . . 210-B-M may be realized in a number of different formats. The neutron sources 210-B-1 . . . 210-B-M can be one or more pulsed-neutron sources. The neutron sources 210-B-1 . . . 210-B-M can be one or more radionuclide sources. The radionuclide sources can include, but are not limited to, Am/Be sources or californium-252 sources. An AmBe source can be made by mixing americium-241 with beryllium. The neutron sources 210-B-1 . . . 210-B-M can include other types of neutron generators.

The detectors 215-B-1 . . . 215-B-N can include one or more dual purpose detectors. The detectors 215-B-1 . . . 215-B-N may include one or more sodium-iodide detectors with the one or more dual purpose detectors. The system 200-B can include instrumentality to make inelastic counts and capture counts of neutron-induced gamma rays and to generate ratios of inelastic counts to capture counts. The system 200-B can include instrumentality to make counts of neutrons detected and counts of gamma rays received from regions exterior to the neutron tool 205-B in response to neutrons from one or more neutron sources 210-B-1 . . . 210-B-M.

The dual purpose detectors can be detectors having a capability to detect both neutrons and gamma rays. The detector can include crystal $Cs_2LiYCl_6$ to measure both neutrons and gamma rays. The crystal $Cs_2LiYCl_6$ can provide a scintillating crystal that measures both neutrons and gamma rays. Other materials that are operable to detect both neutrons and gamma rays can be used. Such detectors can be used in measurements that can provide a better porosity measurement at high porosity than conventional tools. The detectors can be enclosed in a flask to improve their response at elevated temperatures. By keeping the detector temperature lower than the ambient downhole temperature, the flask may serve to increase the signal amplitude and improve reliability of the pulse-shape discrimination.

In addition to the one or more neutron sources 210-B-1 . . . 210-B-M operable in the borehole 204-B to probe the formation 202-B and the one or more detectors 215-B-1 . . . 215-B-N, where at least one of the one or more detectors 215-B-1 . . . 215-B-N has a capability to detect both neutrons and gamma rays, the system 200-B can include a processing unit 225-B arranged to operatively determine porosity of the formation 202-B from data based on the neutrons and gamma rays detected by one or more detectors having the capability to detect both neutrons and gamma rays. The one or more detectors 215-B-1 . . . 215-B-N can be spaced apart from one or more neutron sources 210-B-1 . . . 210-B-M. The one or more detectors 215-B-1 . . . 215-B-N may include two detectors having the capability to detect both neutrons and gamma rays. The two detectors having the capability to detect both neutrons and gamma rays can have different spacings from a neutron source. Both detectors can include crystal $Cs_2LiYCl_6$ to measure both neutrons and gamma rays.

The processing unit 225-B can be structured to operatively implement pulse-shape discrimination to differentiate between neutrons and gamma rays. This discrimination can be based on the neutrons and the gamma rays interacting with material of the detector to produce outputs with different time profiles. The processing unit 225-B may also implement a pulse height discrimination based on signal amplitudes from the detector being different for the signals generated from interaction of neutrons with the material of the detector and the signals generated from interaction of gamma rays with the material of the detector. The pulse height discrimination can be used with the pulse-shape discrimination in the analysis of the measurement signals.

The processing unit 225-B can be structured to operatively determine a ratio of number of gamma rays that reach the detector to number of neutrons that reach the detector. The processing unit 225-B can be structured to operatively map the ratio to the porosity of the formation. The processing unit 225-B can be structured to operatively determine a first ratio of number of gamma rays that reach the detector to number of neutrons that reach the detector and to determine a second ratio of number of gamma rays that reach another detector to number of neutrons that reach the other detector, where the other detector can detect both neutrons and gamma rays. The processing unit 225-B can be structured to operatively combine the first ratio and the second ratio to determine the porosity of the formation. The processing unit 225-B can implement gamma ray processing using known techniques for gamma ray processing in porosity measurements. In various embodiments, neutron measurements can be utilized in the porosity measurement to improve the porosity measurement.

The instrumentality can include a control unit 220-B to manage operation of the number of neutron sources 210-B-1 . . . 210-B-M and the number of detectors 215-B-1 . . . 215-B-N. The control unit 220-B and the processing unit 225-B may be integrated with each other. The control unit 220-B and the processing unit 225-B may be integrated with the neutron tool 205-B operable downhole. The control unit 220-B and the processing unit 225-B may have distributed components. Distributed components may include components downhole in the vicinity of the neutron tool 205-B deployed for operation and components at the surface or at locations between the surface and the vicinity of the operational neutron tool 205-B.

Methods of making porosity measurements, using dual purpose detectors that can detect neutrons and gamma rays, can make use of the fact that the transport of the neutrons is different from that of the transport of gamma rays. As the formation porosity increases, the attenuation of neutrons increases due to the increased hydrogen density, so the number of neutrons reaching a detector drops rapidly. This also causes fewer gamma rays to be generated near the detector. However, the attenuation coefficient of the formation for gamma rays decreases with porosity due to the lower density. This makes it easier for gamma rays to reach a detector. The net result is that the number of gamma rays that reach a detector drops with porosity, but not as fast as the number of neutrons. Thus, if one takes a ratio of the number gamma rays that reach a detector to the number of neutrons that reach it, the ratio will increase with porosity, even at large porosities.

Figure 3:
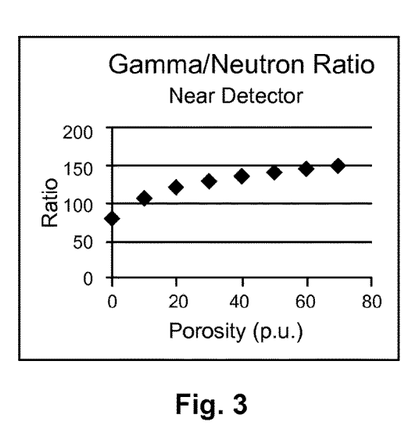
FIGS. 3-4 illustrate the use of ratios of gamma rays to neutrons, in accordance with various embodiments.
Figure 4:
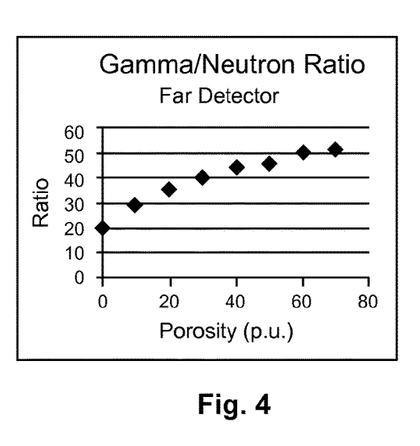

FIGS. 3-4 illustrate the use of ratios of gamma rays to neutrons. The data in the plots was generated from computer modeling of an arrangement of near and far dual purpose detectors using crystal $Cs_2LiYCl_6$. In the modeling, it was assumed that 50% of the lithium in the detector was lithium-6, but that assumption only affects the magnitude of the neutron count rates and the ratios, not the shapes of the response curves. The sensitivity to porosity is better in the far detector, as expected, but due to the higher count rates in the near detector, the statistical uncertainty in the porosity determination is comparable between the two. The ratio may be measured for both detectors and combined to obtain the porosity, although the porosity could be obtained from just one detector. Detectors at different spacings can also be used.

Figure 5:
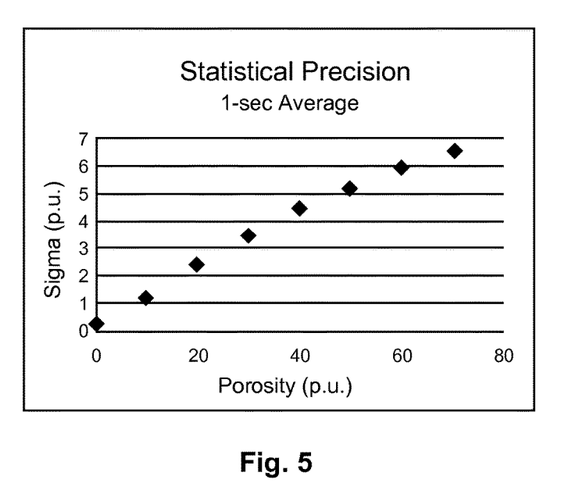
FIG. 5 shows the precision of measurement using 1-sec samples, in accordance with various embodiments.

FIG. 5 shows the precision of the above measurement arrangement using 1-sec samples for the far detector in terms of sigma. Filtering over many seconds may greatly improve the precision. For example, averaging over 4 seconds would cut uncertainty in half. Also, including the near detector in the analysis would reduce the uncertainty by about 40%.

Figure 6:
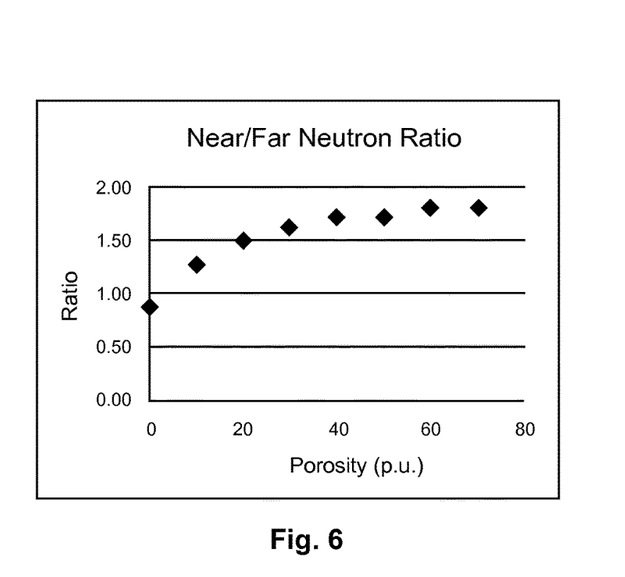
FIG. 6 shows a ratio of neutron count rate of a near detector to neutron count rate of a far detector, in accordance with various embodiments.

FIG. 6 shows ratios of neutron count rates of a near detector to neutron count rates of a far detector. This is provided when the two detectors both measure neutrons. As shown in FIG. 6, the ratio of the near-to-far neutron count rates has sensitivity to porosity. This ratio can be used to improve the statistical analysis of the measurement.

Figure 7:
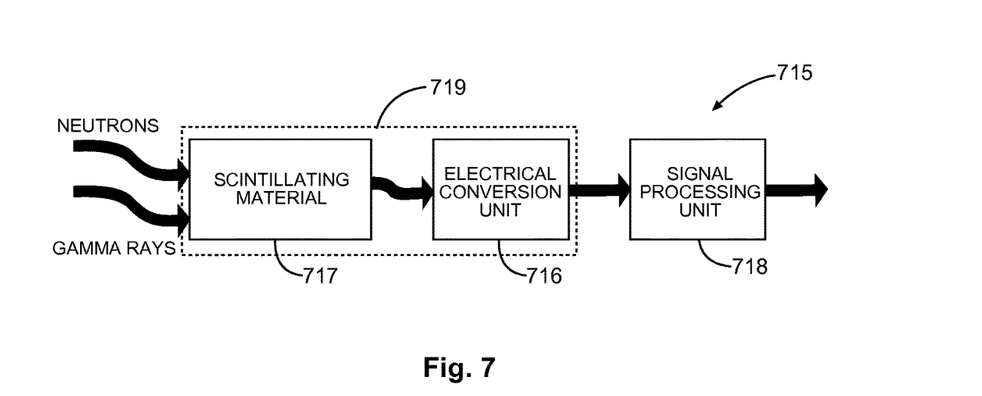
FIG. 7 shows features of an example of a dual purpose detector, in accordance with various embodiments.

FIG. 7 shows an example embodiment of an example dual purpose detector 715 that may be implemented to detect both neutrons and gamma rays to determine porosity of a formation. The detector 715 may be disposed in a neutron tool identical or similar to neutron tool 205 of FIG. 2. The detector 715 can include a scintillating material 717, an electrical conversion unit 716, and a signal processing unit 718. The detector 715 can be disposed in a neutron tool in a borehole such that neutrons and gamma rays are incident on the scintillating material 717 in response to generation of neutrons by a neutron source of the neutron tool. The scintillating material 717 generates light when excited by the incident neutrons and gamma rays. The scintillating material 717 may be a $Cs_2LiYCl_6$ material. The $Cs_2LiYCl_6$ material may be doped $Cs_2LiYCl_6$. For example, the $Cs_2LiYCl_6$ material may be doped with cerium (Ce). Other materials for the detector may be used, where these other materials are capable of interacting with both neutrons and gamma rays to generate outputs that provide signals discriminating between being generated by neutrons and being generated by gamma rays. Such other materials may include $Cs_2LiLaCl_6$, doped $Cs_2LiLaCl_6$ such as Ce-doped $Cs_2LiLaCl_6$, and other similar materials.

The scintillating material 717, such as but not limited to $Cs_2LiYCl_6$, for the detector can be enclosed in a flask 719 to improve signal amplitude and pulse-shape discrimination at elevated temperatures. Flask 719 can encompass both the scintillating material 717 and the electrical conversion unit 716 for arrangements in which the electrical conversion unit 716 is directly coupled to the scintillating material 717. In such an arrangement, flask 719 can improve the life span of the electrical conversion unit 716 along with life span of the scintillating material 717. Alternatively, flask 719 may encompass only the scintillating material 717, the scintillating material 717 and some of the electronics, or the scintillating material 717, the electrical conversion unit 716, and additional electronics.

The generated light is collected by the electrical conversion unit 716 to convert the light to an electrical signal. The electrical conversion unit 716 can be realized by devices such as, but not limited to, photomultiplier tubes, photodiodes, phototransistors, or other devices that generate electrons from incident light or provides a signal, such as a voltage signal, in response to light incident on such devices.

Signals from the electrical conversion unit 716 can be processed by the signal processing unit 718. The signal processing unit 718 can include sampling, timing, and other circuitry to condition signals from the electrical conversion unit 716. The conditioned signals may be used to implement pulse-shape discrimination, pulse height discrimination, or the combination of pulse-shape discrimination and pulse height discrimination in addition to providing other conditioning for analysis of the measurement signals. The conditioned signals may be transmitted to a processing unit such as the processing unit 225 of FIG. 2 or other similar processing unit. The signal processing unit 718 may be realized in a number of different formats. The signal processing unit 718 may form part of the processing unit 225. The signal processing unit 718 may be a distributed component of the processing unit 225. The signal processing unit 718 may be integrated with the processing unit 225. Architectures of dual purpose detectors other than shown in FIG. 7 may be implemented to determine porosity of a formation from detecting both neutrons and gamma rays.

Figure 8:
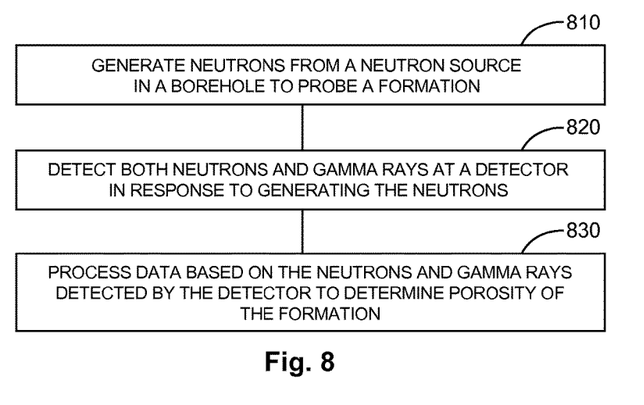
FIG. 8 shows features of an example method to determine porosity of a formation, in accordance with various embodiments.

FIG. 8 shows features of a method to determine porosity of a formation. At 810, neutrons are generated from a neutron source in a borehole to probe a formation. The neutron source used to generate the neutrons may be realized in a number of different formats. The neutron source can be one or more pulsed-neutron sources. The neutron source can be one or more radionuclide sources. The radionuclide sources can include, but are not limited to, Am/Be sources or californium-252 sources. The neutron source may be realized including other types of neutron generators.

At 820, both neutrons and gamma rays are detected at a detector spaced apart from the neutron source in response to generating the neutrons. The detector can include crystal $Cs_2LiYCl_6$ to measure both neutrons and gamma rays. The detector can be enclosed in a flask to increase signal amplitude and facilitate pulse-shape discrimination at elevated temperatures. The method can include detecting both neutrons and gamma rays at another detector having a capability to detect both neutrons and gamma rays. The other detector can have a spacing from the neutron source different from that of the detector. The other detector can include crystal $Cs_2LiYCl_6$ to measure both neutrons and gamma rays.

At 830, data based on the neutrons and gamma rays detected by the detector is processed to determine porosity of the formation. The method can include implementing pulse-shape discrimination to differentiate between neutrons and gamma rays. The method can include determining a ratio of number of gamma rays that reach the detector to number of neutrons that reach the detector. The method can include mapping the ratio to the porosity of the formation. The method can include determining a first ratio of number of gamma rays that reach the detector to number of neutrons that reach the detector and determining a second ratio of number of gamma rays that reach another detector to number of neutrons that reach the other detector, where the other detector is capable of detecting both neutrons and gamma rays. The method can include combining the first ratio and the second ratio to determine the porosity of the formation.

In various embodiments, components of a system operable to conduct measurements of a formation, as described herein or in a similar manner, can be realized in combinations of hardware and software-based devices, or in simulations. These implementations can include a machine-readable storage device having machine-executable instructions, such as a computer-readable storage device having computer-executable instructions, which instructions when executed cause a machine to perform operations. The operations can include operations to generate neutrons from a neutron source in a borehole to probe a formation; to detect both neutrons and gamma rays at a detector spaced apart from the neutron source in responsive to generating the neutrons; and to process data based on the neutrons and gamma rays detected by the detector to determine porosity of the formation. The instructions can include instructions to provide data to a processing unit such that the processing unit can conduct one or more processes to evaluate signals, data, or signals and data. In various embodiments, a machine-readable storage device or devices having instructions stored thereon, which, when performed by a machine, can cause the machine to perform operations, the operations including performing any one of the processes or similar processes as taught herein. Further, a machine-readable storage device, herein, is a physical device that stores data represented by physical structure within the device. Examples of machine-readable storage devices include, but are not limited to, read only memory (ROM), random access memory (RAM), a magnetic disk storage device, an optical storage device, a flash memory, and other electronic, magnetic, and/or optical memory devices.

Figure 9:
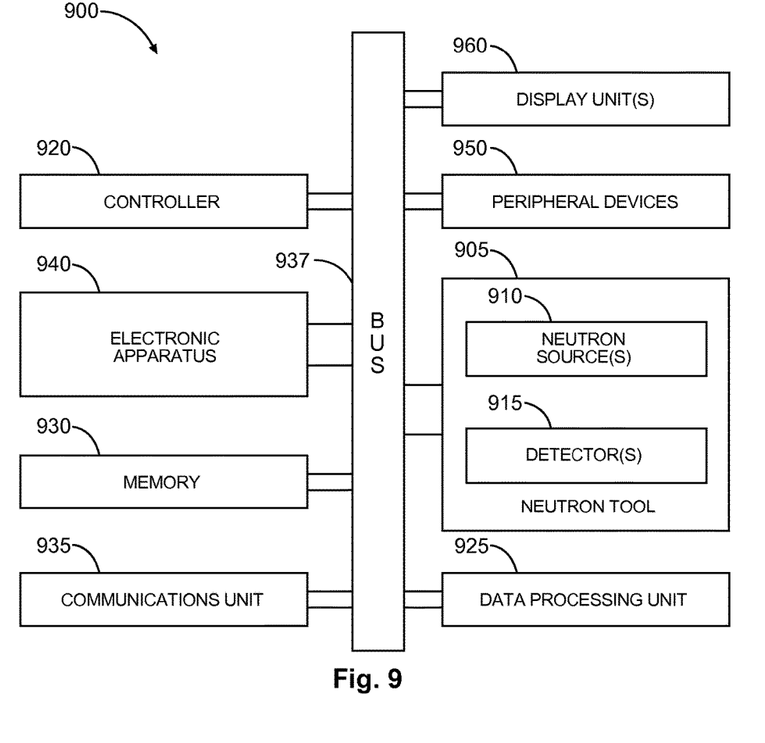
FIG. 9 depicts a block diagram of features of an example system operable to determine porosity of a formation using a dual purpose detector, in accordance with various embodiments.

FIG. 9 depicts a block diagram of an embodiment of features of an example system 900 operable to determine porosity of a formation using a dual purpose detector, as described herein or in a similar manner. The system 900 can include a neutron tool 905 having an arrangement of neutron source(s) 910 and detector(s) 915 that can be realized in a similar or identical manner to arrangements and processing discussed herein. The system 900 can be configured to operate in accordance with the teachings herein to detect both gamma rays and neutrons in one ore more dual purpose detectors and determine porosity of a formation based on the detected neutrons and gamma rays.

The system 900 can include a controller 920, a memory 930, an electronic apparatus 940, and a communications unit 935. The memory 930 can be structured to include a database. The controller 920, the memory 930, and the communications unit 935 can be arranged to operate as a processing unit to control operation of the neutron source(s) 910 and the detector(s) 915 and to perform operations on the signals collected by the detector(s) 915 to conduct porosity evaluation of the formation. A processing unit 925, structured to conduct porosity evaluation of the formation using one or more dual purpose detectors, can be implemented as a single unit or distributed among the components of the system 900 including electronic apparatus 940. The electronic apparatus 940 can provide other circuitry for operation of the system 900. The controller 920 and the memory 930 can operate to control activation of the neutron source(s) 910 to generate neutron pulses. The controller 920 and the memory 930 can operate to control selection of the detector(s) 915 in the neutron tool 905 and to manage processing schemes. The controller 920, the memory 930, and other components of the system 900 can be configured, for example, to operate similar to or identical to the components discussed herein or similar to or identical to any of methods discussed herein.

The communications unit 935 can include downhole communications for appropriately located sensors in a drilling operation. Such downhole communications can include a telemetry system. The communications unit 935 may use combinations of wired communication technologies and wireless technologies at frequencies that do not interfere with on-going measurements.

The system 900 can also include a bus 937, where the bus 937 provides electrical conductivity among the components of the system 900. The bus 937 can include an address bus, a data bus, and a control bus, each independently configured or in an integrated format. The bus 937 can be realized using a number of different communication mediums that allows for the distribution of components of the system 900. The bus 937 can include a network. Use of the bus 937 can be regulated by the controller 920.

In various embodiments, the peripheral devices 950 can include additional storage memory and other control devices that may operate in conjunction with the controller 920 and the memory 930. In an embodiment, the controller 920 can be realized as a processor or a group of processors that may operate independently depending on an assigned function.

The system 900 can include display unit(s) 960 as a distributed component on the surface at a drilling operation, which can be used with instructions stored in the memory 930 to implement a user interface to monitor the operation of the neutron tool 905 or components distributed within the system 900. The user interface may be used to input parameter values for thresholds such that the system 900 can operate autonomously substantially without user intervention in a variety of applications. The user interface can also provide for manual override and change of control of the system 900 to a user. Such a user interface can be operated in conjunction with the communications unit 935 and the bus 937.

Figure 10:
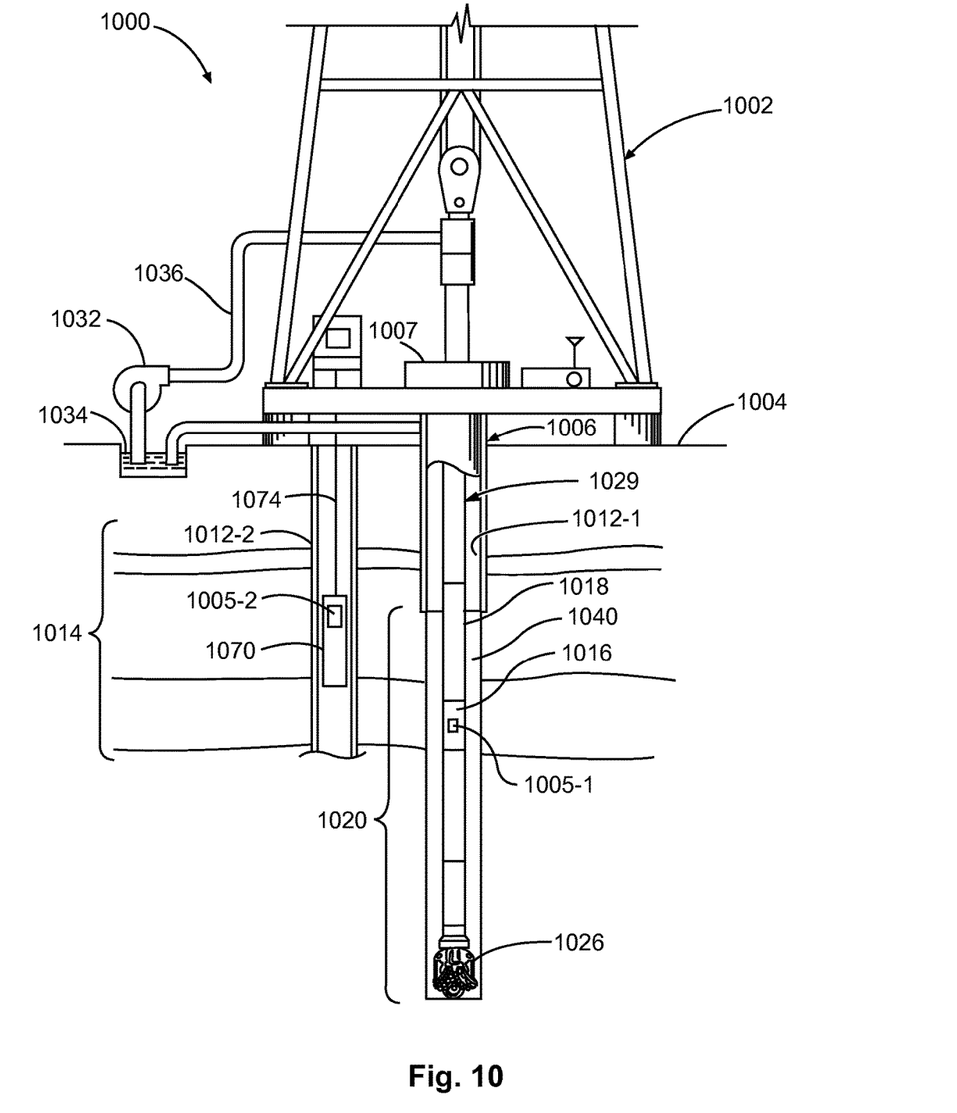
FIG. 10 depicts an example system at a drilling site, where the system is operable to determine porosity of a formation using a dual purpose detector, in accordance with various embodiments.

FIG. 10 depicts an example system 1000 at a drilling site, where the system is operable to determine porosity of a formation using a dual purpose detector. The system 1000 can include a tool 1005-1, 1005-2, or both 1005-1 and 1005-2 to conduct measurements and analysis using a dual purpose detector as taught herein. Tools 1005-1 and 1005-2 can be realized in a similar or identical manner to arrangements taught herein to detect both gamma rays and neutrons in a detector.

System 1000 can include a drilling rig 1002 located at a surface 1004 of a well 1006 and a string of drill pipes, that is, drill string 1029, connected together so as to form a drilling string that is lowered through a rotary table 1007 into a wellbore or borehole 1012-1. Drilling rig 1002 can provide support for drill string 1029. Drill string 1029 can operate to penetrate rotary table 1007 for drilling through the borehole 1012-1 through subsurface formations 1014. Drill string 1029 can include drill pipe 1018 and a bottom hole assembly 1020 located at the lower portion of drill pipe 1018.

The bottom hole assembly 1020 can include a drill collar 1016 and a drill bit 1026. Drill bit 1026 can operate to create borehole 1012-1 by penetrating the surface 1004 and the subsurface formations 1014. Bottom hole assembly 1020 can include tool 1005-1 attached to drill collar 1016 to perform neutron and gamma ray measurements to conduct porosity evaluation. Tool 1005-1 can be structured for an implementation in a measure-while-drilling (MWD) system such as a logging-while-drilling (LWD) system. The housing containing tool 1005-1 can include electronics to activate generation of neutron pulses from neutron source(s) of tool 1005-1 into a formation being analyzed and collect responses from detector(s) of tool 1005-1. Such electronics can include a processing unit to provide porosity analysis of the formation to the surface over a standard communication mechanism for operating in a well. Alternatively, electronics can include a communications interface to provide signals output by detector(s) of tool 1005-1 to the surface over a standard communication mechanism for operating in a well, where these output signals can be analyzed at a processing unit at the surface to determine porosity of the formation.

During drilling operations, drill string 1029 can be rotated by rotary table 1007. In addition to, or alternatively, the bottom hole assembly 1020 can also be rotated by a motor (e.g., a mud motor) that is located downhole. Drill collars 1016 can be used to add weight to drill bit 1026. Drill collars 1016 also can stiffen the bottom hole assembly 1020 to allow the bottom hole assembly 1020 to transfer the added weight to drill bit 1026, and in turn, assist drill bit 1026 in penetrating surface 1004 and subsurface formations 1014.

During drilling operations, a mud pump 1032 can pump drilling fluid (sometimes known by those of skill in the art as "drilling mud") from a mud pit 1034 through a hose 1036 into drill pipe 1018 and down to drill bit 1026. The drilling fluid can flow out from drill bit 1026 and be returned to the surface 1004 through an annular area 1040 between drill pipe 1018 and the sides of the borehole 1012-1. The drilling fluid may then be returned to mud pit 1034, where such fluid is filtered. In some embodiments, the drilling fluid can be used to cool drill bit 1026, as well as to provide lubrication for drill bit 1026 during drilling operations. Additionally, the drilling fluid may be used to remove subsurface formation 1014 cuttings created by operating drill bit 1026.

In various embodiments, tool 1005-2 may be included in a tool body 1070 coupled to a logging cable 1074 such as, for example, for wireline applications. The tool body 1070 containing the tool 1005-2 can include electronics to activate generation of neutron pulses from neutron source(s) of tool 1005-2 into a formation being analyzed and collect responses from detector(s) of tool 1005-2. Such electronics can include a processing unit to provide analysis of porosity of the formation to the surface over a standard communication mechanism for operating in a well. Alternatively, electronics can include a communications interface to provide signals output by detector(s) of tool 1005-2 to the surface over a standard communication mechanism for operating in a well, where these output signals can be analyzed at a processing unit at the surface to determine porosity of the formation. The logging cable 1074 may be realized as a wireline (multiple power and communication lines), a mono-cable (a single conductor), and/or a slick-line (no conductors for power or communications), or other appropriate structure for use in the borehole 1012. Though FIG. 10 depicts both an arrangement for wireline applications and an arrangement for LWD applications, the system 1000 may be also realized for one of the two applications.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. An apparatus comprising:
  a neutron source operable in a borehole to probe a formation;
  a detector spaced apart from the neutron source, the detector to detect both neutrons and gamma rays; and
  a processor arranged to operatively determine a porosity of the formation based on a ratio of a number of the neutrons that reach the detector and a number of the gamma rays that reach the detector.

2. The apparatus of claim 1, wherein the detector comprises crystal $Cs_2LiYCl_6$.

3. The apparatus of claim 1, wherein the detector is enclosed in a flask.

4. The apparatus of claim 1, wherein the neutron source comprises a pulsed-neutron source.

5. The apparatus of claim 1, wherein the neutron source comprises a radionuclide source.

6. The apparatus of claim 1, wherein the apparatus comprises an other detector having a capability to detect both neutrons and gamma rays.

7. The apparatus of claim 6, wherein the other detector has a spacing from the neutron source different from that of the detector.

8. The apparatus of claim 6, wherein the other detector comprises crystal to measure both neutrons and gamma rays.

9. The apparatus of claim 6, wherein the processor is structured to operatively determine a second ratio of a second number of gamma rays that reach the other detector to a second number of neutrons that reach the other detector.

10. The apparatus of claim 9, wherein the processor is structured to operatively combine the ratio and the second ratio to determine the porosity of the formation.

11. The apparatus of claim 1, wherein the processor is structured to operatively implement pulse-shape discrimination to differentiate between neutrons and gamma rays.

12. The apparatus of claim 1, wherein the processor is structured to operatively map the ratio to the porosity of the formation.

13. A method comprising:
generating neutrons from a neutron source in a borehole to probe a formation;
detecting both neutrons and gamma rays using a detector spaced apart from the neutron source in response to generating the neutrons; and
determining a porosity of the formation based on a ratio of a number of the neutrons that reach the detector and a number of the gamma rays that reach the detector.

14. The method of claim 13, wherein the detector comprises crystal $Cs_2LiYCl_6$.

15. The method of claim 13, wherein the detector is enclosed in a flask.

16. The method of claim 13, wherein generating neutrons from the neutron source comprises generating neutrons from a pulsed-neutron source.

17. The method of claim 13, wherein generating neutrons from the neutron source comprises generating neutrons from a radionuclide source.

18. The method of claim 13, wherein the method comprises detecting both neutrons and gamma rays at an other detector having a capability to detect both neutrons and gamma rays.

19. The method of claim 18, wherein the other detector has a spacing from the neutron source different from that of the detector.

20. The method of claim 18, wherein the other detector comprises crystal to measure both neutrons and gamma rays.

21. The method of claim 18, wherein the method comprises determining a second ratio of number of gamma rays that reach the other detector to number of neutrons that reach the other detector.

22. The method of claim 21, wherein the method comprises combining the ratio and the second ratio to determine the porosity of the formation.

23. The method of claim 13, wherein the method comprises implementing pulse-shape discrimination to differentiate between neutrons and gamma rays.

24. The method of claim 13, wherein the method comprises mapping the ratio to the porosity of the formation.

25. A machine-readable storage device having instructions stored thereon, which, when performed by a machine, cause the machine to perform operations, the operations comprising:
generating neutrons from a neutron source in a borehole to probe a formation;
detecting both neutrons and gamma rays using a detector spaced apart from the neutron source in response to the generation of the neutrons; and
determining a porosity of the formation based on a ratio of a number of the neutrons that reach the detector and a number of the gamma rays that reach the detector.

26. The machine-readable storage device of claim 25, wherein the detector comprises crystal $Cs_2LiYCl_6$.

27. The machine-readable storage device of claim 25, wherein the operations detecting both neutrons and gamma rays at another detector having a capability to detect both neutrons and gamma rays.

28. The machine-readable storage device of claim 27, wherein the other detector comprises crystal to measure both neutrons and gamma rays.

29. The machine-readable storage device of claim 27, wherein the other detector has a spacing from the neutron source different from that of the detector.

30. The machine-readable storage device of claim 27, wherein the operations further comprise determining a second ratio of a second number of gamma rays that reach the other detector to a second number of neutrons that reach the other detector.

* * * * *